July 27, 1937.   B. J. SEAY   2,088,537
GRADER
Filed Feb. 15, 1936   3 Sheets-Sheet 3

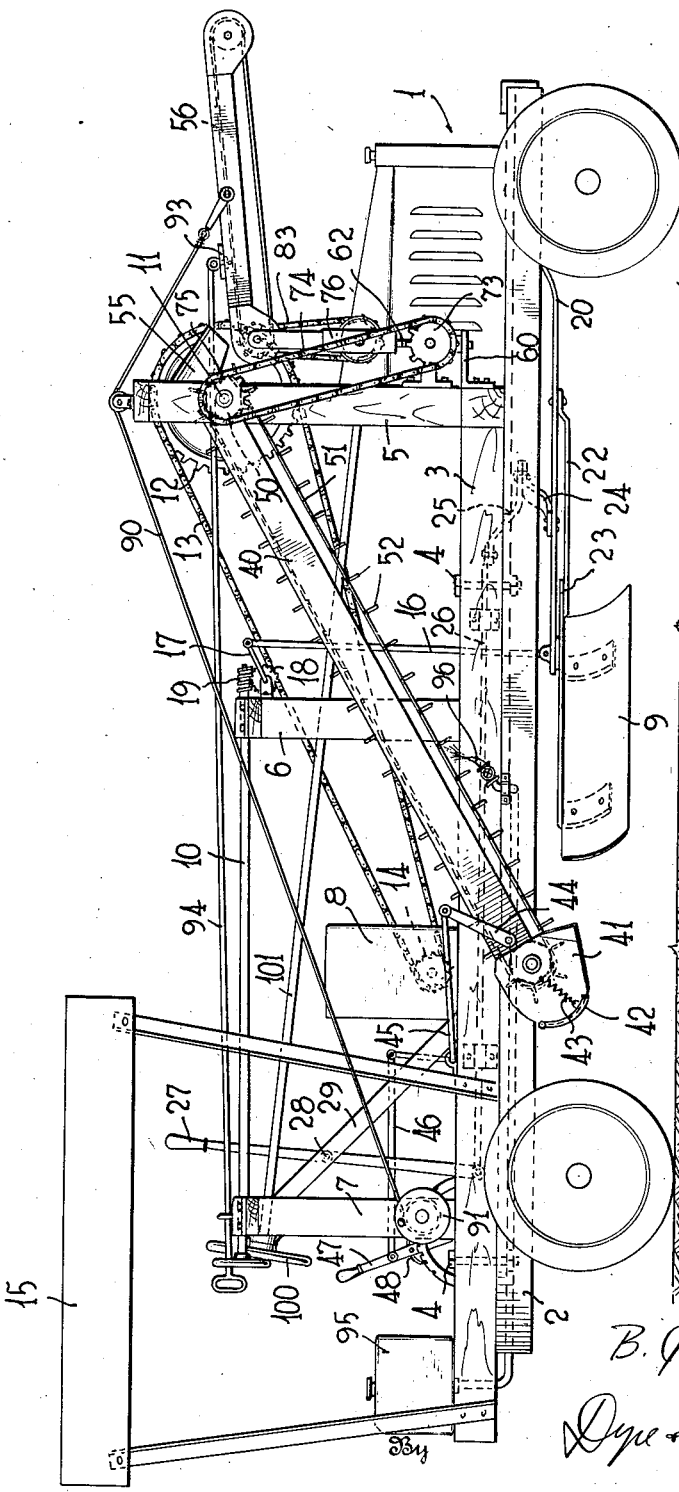

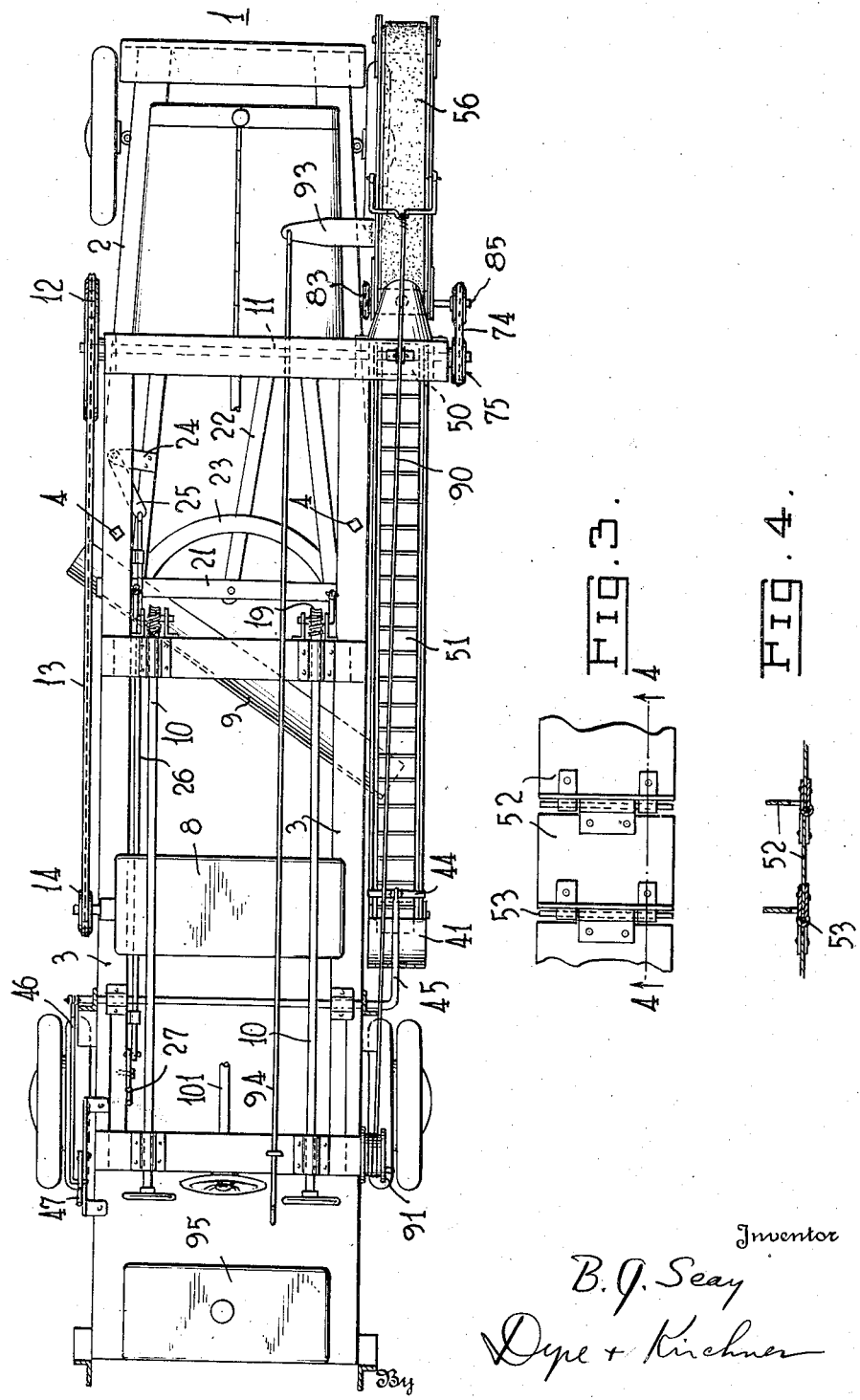

Inventor
B. J. Seay
Dyre + Kirchner
By
Attorneys

Patented July 27, 1937

2,088,537

UNITED STATES PATENT OFFICE 2,088,537

GRADER

Brother John Seay, Ocala, Fla.

Application February 15, 1936, Serial No. 64,097

7 Claims. (Cl. 37—108)

My invention relates to graders, and more particularly to the type which includes means for removing material from a roadway or the like and means for elevating that material to a point where it can be dropped into a dump truck or the like.

An important object of the invention is to provide grading and elevating means on a framework which is adapted to be mounted on a standard type of motor truck chassis, the framework carrying all the material handling equipment and a prime mover therefor so that the parts carried by the framework comprise a unit independent of the motor vehicle. An advantage of this feature of the construction is that the independent and unitary equipment may be independently manufactured and mounted on motor truck chassis units of standard, familiar and inexpensive design. A further advantage resides in the complete separation of the prime movers to supply motive power to the truck and to operate the material handling equipment, so that the mobility of the truck carrying equipment depends in no way on the means for powering the equipment; hence the truck carrying the equipment can be readily and speedily moved from one scene of operations to another.

A further object of the invention is to provide means for discharging material removed by a scraper or analogous element into dump trucks or the like which may be run in alignment with or parallel to the truck on which the equipment is mounted. To this end I provide an elevator for the material which discharges into a swinging conveyor preferably mounted at a forward part of the side of the truck, as will be explained more in detail hereinafter.

Incidental and ancillary features of importance comprise extending the controls of the truck and its engine from their normal position on a forward part of the truck chassis to a cab mounted on the rear thereof in juxtaposition to the control means for the material handling equipment so that a single operator can easily drive the truck and control the material handling equipment.

Further objects are to provide a construction of the type indicated which will be simple, durable and comparatively inexpensive.

Other objects will appear as the description hereinafter proceeds.

A preferred form of embodiment is illustrated by the accompanying drawings which form part of this application for letters patent and in which:

Figure 1 is a side elevational view;

Fig. 2 is a plan view;

Fig. 3 is a detail of a preferred type of elevator belt;

Fig. 4 is a cross sectional view taken on the line 4—4 of Fig. 3;

Figure 5:
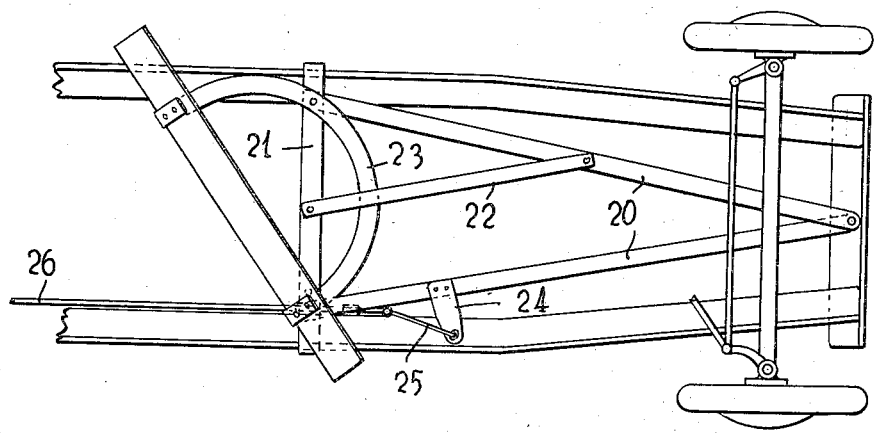
Fig. 5 is a plan view of the forward part of the truck chassis showing the ground engaging element and its immediate connections.
Figure 6:
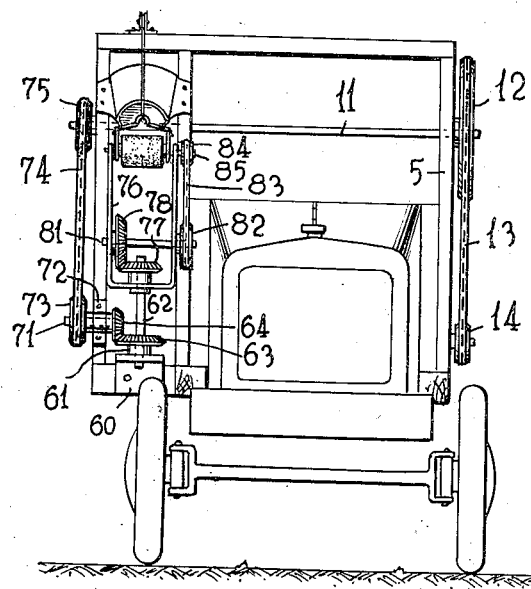
Fig. 6 is a front elevational view.

Referring now to the drawings, the reference numeral 1 designates any standard type of motor truck chassis, preferably including the usual angle iron side members 2. Mounted on these side members are the side sills 3 of a supporting frame for the material handling equipment. The frame is mounted on the chassis by positioning the side sills on the side members 2 and by bolting the sills thereto as by means of the nut and bolt units 4. As shown, the chassis is stripped behind the motor hood and dash to provide a clear space for receiving the supporting frame.

The bed of the supporting frame includes end cross members connecting the sills and any necessary or convenient number of intermediate cross members for strengthening the frame. From the bed a forward upright frame 5 rises, and also rising from the bed is an intermediate upright frame 6. Near the after end of the supporting bed a third or rear upright frame 7 may be mounted, and between the frames 6 and 7 a prime mover such as a gasoline engine and its appurtenances, all conventionally indicated at 8, may be positioned. The intermediate frame 6 provides support for the ground engaging element which may be a blade 9 and for the adjusting means therefor, such as the control rods 10. The forward upright frame 5 contains bearings for a jack shaft 11 on one end of which a sprocket 12 is fast which is connected by a chain 13 to a gear 14 on the crankshaft of the engine 8. The rear upright frame 7, or its equivalent, may be covered by a roof 15 forming a sort of cab, in which the frame 7 carries hand wheels or the like at the ends of the rods 10, as well as analogous elements at the ends of various other control connections hereinafter described.

Broadly speaking, the primary ground engaging element may be any means capable of removing material from the ground traversed by the equipment. I have selected the blade 9 for illustration. This blade is hung from the upright frame 6 by means of the two links 16 the upper ends of which are loosely pin connected to bent arms 17 each of which is fast in a pinion 18 which meshes with a worm 19 fast on one of the control rods 10. To clear the customary drive shaft or torque tube of the truck, the links 16 depend adjacent the side sills 3.

The blade 9 extends at an oblique angle to the longitudinal axis of the truck and is mounted for various adjustments. A preferred mode of mounting is illustrated and will now be described. The blade is carried at the rear end of a generally triangular frame which includes the radius rods 20 pivoted to some forward part of the chassis and the base rod 21, stiffened by a brace 22 and carrying a curved arm 23 from the rear free ends of which the blade depends. A short arm 24 extends from a side of one of the radius rods 20 and a bent link 25 connects the free end of the arm 24 to a rod 26 which is journaled for reciprocation in slide bearings on one of the side sills and is pin-connected at its rear end to the lower end of a control lever 27 in the cab. It will be clear from the foregoing that movement of the lever 27 about its fulcrum 28 (conveniently on a diagonal brace 29 which stiffens a rear upright frame 7) will have the effect of reciprocating the rod 26 and swinging the blade carrying frame about its pivot at the forward end of the chassis. In this way the blade is moved laterally of the apparatus.

The blade is elevated and lowered by turning the rods 10 which results in lifting or lowering either or both of the links 16. The blade may thus not only be lifted and lowered but its angle to the vertical may be made normal or oblique by simply turning one of the rods 10 more or less than the other. In this way the blade may be caused to conform to the angle required by the crown of a road.

It will be understood that movement of the truck with the blade 9 properly adjusted to engage the ground will result in a scraping of material from the ground, and, because of the oblique disposition of the blade, the material will be slid along the blade and discharged at its trailing end. The apparatus includes means for elevating such material and ultimately discharging it, as for example, into a dump truck. This equipment will now be described.

Pivoted to an upper part of the forward upright frame 5 is an elevator 40, conveniently of the endless belt type. The lower end of the elevator depends along the outside of one of the side sills 3 and terminates in a scoop 41 having a safety gate 42 urged to closed position as by a spring 43. A yoke 44 hangs the lower end of the elevator from a bent rod 45 which has one end linked by the connection 46 to a lever 47 in the cab. By a segmental rack and pawl arrangement 48 this lever can be fixed in any adjusted position to maintain the scoop 41 on or above the ground level. When on the ground level the scoop is in alignment with the trailing end of the scraper 9. The jack shaft 11 drive the roller 50 to power the endless belt 51 of the elevator. While any acceptable type of belt may be used, I show a preferred form which comprises cleated sections conveniently made up by a series of hinged angle plates 52 connected by hinge pins 53, as clearly shown by Figs. 3 and 4. No flexible backing of any kind is required for the plates 52. The driving and idling rollers at opposite ends of this elevator belt 51 are polygonal faced, as shown in Fig. 1, so that good positive driving and driven engagement is made with the flat under surfaces of the plates 52.

It will be evident that rotation of the jack shaft 11 by the engine 8 will cause the elevator to receive and lift material removed by the blade 9.

At the top of the elevator I provide a chute 55 which discharges onto a conveyor 56. This conveyor is of the driven, endless belt type, and because its function is not primarily or ordinarily to lift the material which it handles, it need not be provided with the cleats of the conveyor belt 51. The receiving end of the conveyor 56 is pivoted for horizontal movement under the chute 55, and the free end of the conveyor, which extends beyond the forward end of the truck, may be lifted and lowered as will be explained. Thus the conveyor may be accurately directed over the body of the dump truck or the like which may precede the apparatus or may parallel it. The conveyor is mounted and powered as follows:

A bracket 60 extends from the forward upright 5 and carries a bearing 61 for a vertical shaft 62 on which a bevel gear 63 is fast. A meshing bevel gear 64 is fast on the shaft 71 journalled in a bracket 72 on the upright frame. A sprocket 73 is fast on the shaft 71 and is driven by a chain 74 from a similar sprocket 75 on the jack shaft 11. The upper end of shaft 62 turns in a yoke 76 and bevelled gears 77, 78 in this yoke rotate horizontal shaft 81 from vertical shaft 62. Sprocket 82 on shaft 81 drives chain 83 which in turn drives sprocket 84 fast on shaft 85 with a roller engaged with and driving the endless belt of conveyor 56. In this way power is taken from the jack shaft to drive the endless belt of the conveyor, and it will be evident that the conveyor is freely movable about horizontal and vertical axes to accomplish various adjustments in its direction as may be required. The vertical axis about which the conveyor 56 may be turned is shaft 62, yoke 76 being mounted for rotation on the shaft 62. The horizontal axis on which the conveyor 56 may be turned is shaft 85 journalled in the upper end of the yoke 76.

The conveyor is turned through any of these movements by manipulating controls in the cab. The conveyor is raised and lowered by winding cable 90 on drum 91 in the cab. Cable 90 is connected to a mid-point on the conveyor, after passing over the pulley at the top of upright frame 5. An arm 93 extends from the side of the conveyor and receives the end of rod 94 the other end of which extends into the cab. On reciprocating rod 94 the conveyor can be moved horizontally.

To prevent objectionable adhesion of soil to the cleats of the elevator belt a stream of water may be directed against the under side of the belt from tank 95 in the cab through a nozzle 96.

It will be evident that the several material handling parts of the equipment can be controlled and adjusted into and out of operative position by an operator in the cab. Such an operator also controls the speed and direction at which the apparatus moves, and accordingly it is necessary to extend back into the cab the usual controls of the motor truck. I have shown the steering wheel 100 mounted in the cab on the end of the extension steering rod 101. The throttle, brake and gear shift controls are similarly extended back to the cab where they are preferably mounted on a fixed part of the truck chassis, rather than the material handling equipment frame. These controls are not shown in the drawings because the particular manner in which the extensions are achieved forms no part of the invention and the illustration of such extensions would only serve to confuse the showing of the material handling equipment and its controls.

It will be appreciated from the foregoing that I have provided compact and unitary equipment which may be readily mounted on a standard truck chassis by the following operations:

The blade carrying frame is pivoted to a forward part of the truck. The sills 3 of the equipment supporting frame are lowered onto the chassis side members 2 and the bolts 4 are tightened. The pin connections between the lower ends of links 16 and the blade carrying frame are then made. The operation of mounting the equipment on the chassis is thus completed, it being understood of course that the extension of the controls of the truck has previously been effected. Transfer of the material handling equipment as a unit from one truck chassis to another is very readily effected.

The cost of the truck unit is much less than the specially made running gear of the usual grading equipment. The speed at which my apparatus can move from one scene of operations to another is very much higher than the maximum speed attainable by the usual grader apparatus.

While I have illustrated and described the invention in a particular form of embodiment, it is to be understood that the principles of the invention are of broad application and that many details of the forms described may be varied without departing from the broad spirit of the invention. All such modifications and variations are to be deemed within the scope and purview of the appended claims, except insofar as those claims are limited by the state of the prior art.

I claim:

1. Grader apparatus adapted to be removably mounted on a standard truck chassis, said apparatus comprising a blade for engaging and scraping the ground traversed by the chassis, an elevator for raising material removed by the blade, a supporting frame including side sills adapted to be connected to the chassis, means for moving the blade laterally of the chassis, and link means hanging the blade from the frame and disposed adjacent the sills whereby clearance is provided for the transmission shaft of the chassis, the lower end of the elevator being disposed below the side sills and said elevator being carried by said frame outside of said sills.

2. Grader apparatus adapted to be removably mounted on a standard truck chassis, said apparatus comprising a pair of side sills adapted to be connected to the chassis, longitudinally spaced upright frames mounted on the sills, a blade below the level of the sills, means for moving the blade laterally of the chassis, means hanging the blade from one of the upright frames comprising a pair of links disposed between and adjacent the sills, and an elevator for material removed by the blade disposed outside of the sills and having an end carried by the other of the upright frames.

3. A grader including longitudinal sills comprisng a mobile frame, a blade for scraping the ground and removing material therefrom to one side of the frame, an endless belt elevator at said side of the frame and adjacent the outer side of one of said sills for receiving and raising material removed by the blade, a conveyor for receiving material from the elevator, means pivotally mounting the receiving end of the conveyor whereby the discharge end thereof may be swung through a limited arc, driving means for the elevator journaled in the frame at the upper end of the elevator, and means hanging the lower end of the elevator from the frame and adjustable to vary the height of said lower end above the ground by pivotally moving the end about said driving means.

4. A grader including a wheeled frame having longitudinal side sills, a blade for scraping the ground and removing material therefrom to one side of the frame, a power driven elevator at said side of the frame depending angularly from a relatively elevated pivot point on the frame to a point adjacent the ground and the discharge end of said scraper, a drive shaft for the elevator journaled in the frame and extending through said pivot point, and means for adjusting the lower end of the elevator toward and from the ground.

5. A grader including a wheeled frame having longitudinal side sills, a blade for scraping the ground and removing material therefrom to one side of the frame, power means mounted on the frame, an elevator at one side of the frame depending angularly from a relatively elevated point on the frame to a point adjacent the ground and the discharge end of said scraper, a drive shaft for the elevator journaled in the frame and constituting a pivot point for the upper end of the elevator, transmission means driving said shaft from said power means, and means for adjusting the lower end of the elevator toward and from the ground.

6. Grader apparatus comprising a truck chassis, a pair of side sills connected to the chassis, longitudinally spaced upright frames mounted on the sills a blade below the level of the sills for scraping the ground and removing material therefrom to one side of the apparatus, means for moving the blade laterally of the chassis, means hanging the blade from one of the upright frames comprising a pair of links disposed between and adjacent the sills, a power driven elevator for material removed by the blade disposed outside of the sills, said elevator depending angularly from a pivot point on the other of the upright frames to a point adjacent the ground and the discharge end of said scraper, a drive shaft for the elevator journaled in the last named frame and extending through said pivot point, and means for adjusting the lower end of the elevator toward and from the ground.

7. Grader apparatus comprising a vehicle chassis, a pair of side sills connected to the chassis, an elevated framework mounted on the sills, a blade below the level of the sills for scraping the ground and removing material therefrom to one side of the apparatus, means for moving the blade laterally of the chassis, means hanging the blade from the elevated framework comprising a pair of links disposed between and adjacent the sills, a power driven elevator for material removed by the blade disposed outside of the sills, said elevator depending angularly from a pivot point on said elevated framework to a point adjacent the ground and the discharge end of said scraper, a drive shaft for the elevator journaled in said elevated framework and extending through said pivot point, and means for adjusting the lower end of the elevator toward and from the ground.

BROTHER JOHN SEAY.